Figure 1:
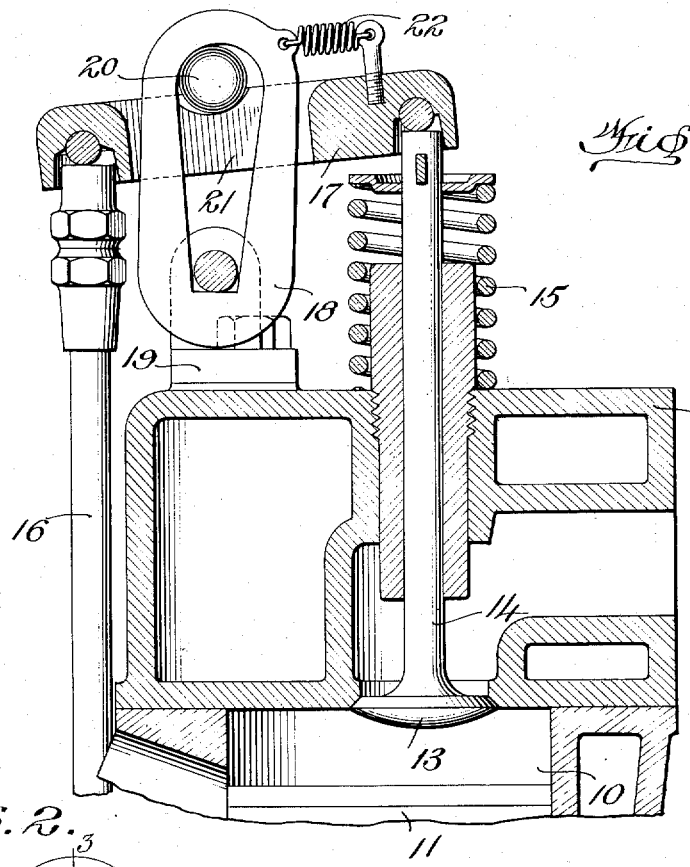

Nov. 10, 1925. Re. 16,205

D. F. ASBURY

VALVE OPERATING MECHANISM

Original Filed April 19, 1920 2 Sheets-Sheet 1

Inventor
D. F. Asbury,
by Bright & Bailey
Attorneys

Nov. 10, 1925. Re. 16,205

D. F. ASBURY

VALVE OPERATING MECHANISM

Original Filed April 19, 1920 2 Sheets-Sheet 2

Inventor
D. F. Asbury,
by Bright & Bailey
Attorneys

Reissued Nov. 10, 1925. Re. 16,205

UNITED STATES PATENT OFFICE.

DORSEY F. ASBURY, OF BROOMES ISLAND, MARYLAND.

VALVE-OPERATING MECHANISM.

Original No. 1,481,951, dated January 29, 1924, Serial No. 374,997, filed April 19, 1920. Application for reissue filed February 11, 1925. Serial No. 8,574.

*To all whom it may concern:*

Be it known that I, DORSEY F. ASBURY, a citizen of the United States, residing at Broomes Island, in the county of Calvert and State of Maryland, have invented certain new and useful Improvements in Valve-Operating Mechanisms, of which the following is a specification.

My invention relates to valve operating mechanisms and has for its purpose to provide improvements in the construction of such mechanisms, particularly of the "rocker arm" type, whereby noise, friction, lubrication and the necessity for adjustment of parts is eliminated.

In my former application for like improvements, filed Feb. 21, 1920, and serially numbered 360,487, I disclosed an arrangement embodying a spring arranged to both yield and act positively as an element of the mechanism, while in my present invention I make use of a yieldable wedging arrangement to accomplish the purposes of the spring element of my former invention.

In the drawings—

Figure 2:
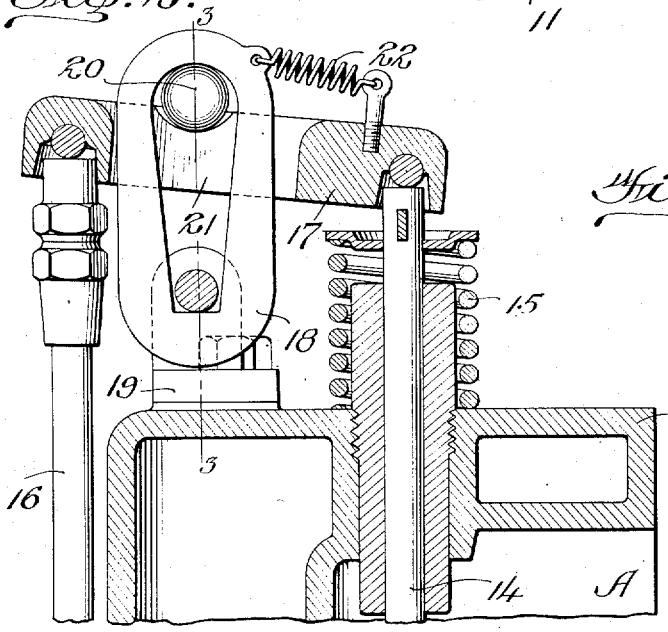
Figure 3:
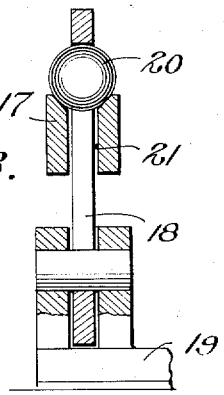
Figure 4:
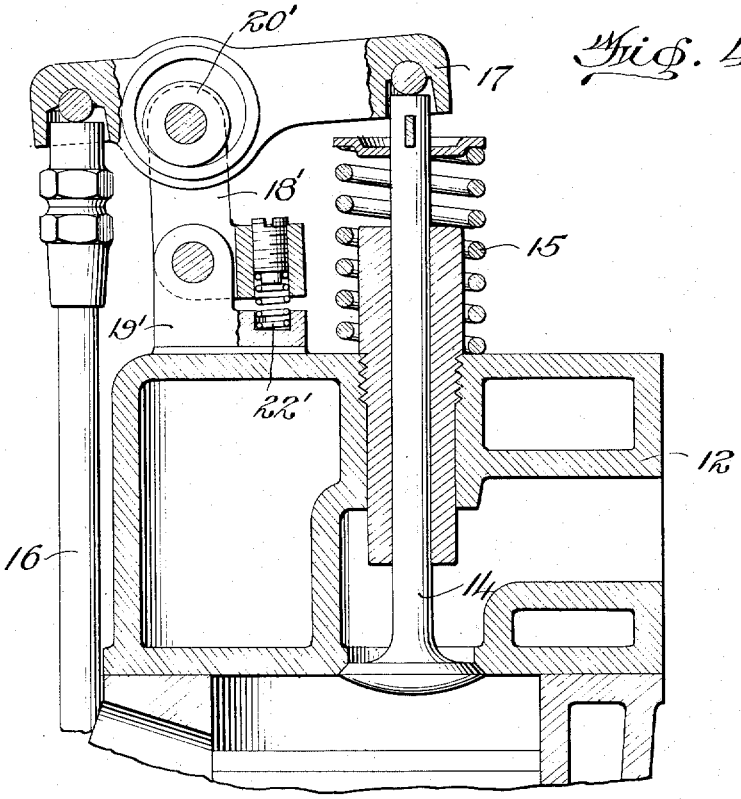

Fig. 1 is a vertical section through an internal combustion engine showing the application of one form of my invention thereto with the parts in an exaggerated normal position;

Fig. 2, a similar view showing the position of the parts when the valve is operated;

Fig. 3, a section on the line 3—3 of Fig. 2;

Fig. 4, a view similar to Fig. 1 of a modified form of my invention; and

Figure 5:
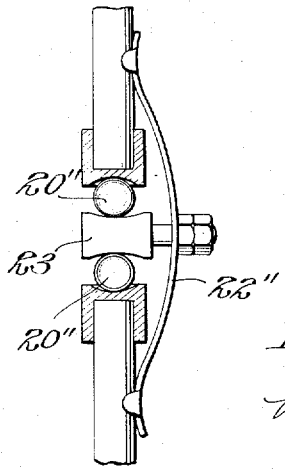

Fig. 5, a view similar to Fig. 1 of another modified form of my invention.

Referring to the drawings in detail, particularly to Figs. 1, 2 and 3, A designates generally a portion of an internal combustion engine of the "valve-in-head" type and includes as is usual a cylinder 10, piston 11 and cylinder head 12. Seating on the head 12 is a puppet valve 13 including a stem 14 which extends through and projects above the head 12 and has associated therewith a spring 15 holding the valve normally to its seat. Disposed in operative relation to the valve 13 is a tappet rod 16 and bridging the upper ends of said tappet rod and the valve stem is a rocker or lever arm 17. Tappet rod 16 is operated in any well known or preferred manner, as by means of a cam (not shown) to actuate the lever arm which in turn is designed to impart desired movements to the valve.

As in my former application previously identified, I provide a rolling contact between the lever arm and the valve stem and between the lever arm and the tappet rod in order to eliminate friction and thereby avoid the necessity of lubricating these relatively contacting parts of the mechanism. This is accomplished by providing convexed surfaces on the lever arm adapted to roll on the upper flat ends of the valve stem and tappet rod as the lever arm is rotated on its pivot during operation of the mechanism.

In order to provide a flexible fulcrum for the lever arm, whereby I am enabled to eliminate noise and friction during operation of the mechanism, I pivot the lower end of a link 18 to a suitable bracket 19 secured to the head 12 and interpose between the link and an intermediate portion of the lever arm a floating member 20 having a rolling contact with both the link and the lever arm. Preferably the floating member 20 consists of a ball and in order to retain the same in place between the link and the lever arm I extend the link through a vertical slot 21 in the lever arm and seat the ball in a depression formed by chamfering the inner upper edges of the side walls of said slot. As a consequence the link and the lever arm are prevented from moving laterally with respect to one another to any appreciable extent, and the ball 20, by reason of being seated in said V-shaped depression, is held against movement transversely of the lever arm so that it cannot become accidentally displaced from its operative position between the link and the lever arm. The chamfered edges of the lever arm are curved in the longitudinal direction of the lever arm at a greater radius than the radius of the ball and likewise the face of the link contacting with the ball is curved corresponding to the curvature of the ball contacting faces of the lever arm. Thus relative movement of the link and lever arm in opposite directions obviously will produce a separation of these parts at right angles to the direction of said relative opposite movement due to the progressively increasing wedging effect produced between the ball and the curved faces of the link and lever arm. Connecting the link with the lever arm is a spring 22 which exerts a tension tending to move the link and lever arm in relative opposite directions and as a result normally maintains the ball in contact with the lever and link on the inclined surfaces and the lever in contact with the tappet rod and valve stem, respectively, the force of said spring intensified by the wedging effect referred to reacting on the tappet rod 16 and valve stem 14 from the cylinder head 12 through the bracket 19, link 18, ball 20 and lever arm 17.

In Figure 1 I have exaggerated the normal position of the ball with respect to the link and lever arm. When the mechanism is operated by an upward movement of the tappet rod to depress and open the valve the force of the spring 22 will be overcome due to the wedge connection between the link and the lever arm and the ball will roll to the position shown in Fig. 2 when it will act as a positive element of the mechanism, its initial action being a yieldable one as is apparent.

In Fig. 4 I show an arrangement having the same action as the arrangement just described, but embodied in a slightly different structure. In this latter instance I provide an L-shaped link 18′ and pivot it as its elbow to a bracket 19′ secured to the cylinder head. Between the vertical arm of this link and the lever arm I provide a rolling wedging contact similar to that provided in the preferred form of my invention with the exception that I utilize a roller 20′ in lieu of the ball 20. The spring 22′ I interpose between the bracket 19′ and the lateral extension of the link and this spring tends to rotate the link on its pivot and cause a wedging action between the roller and lever arm to maintain the parts of the mechanism in contact.

In Fig. 5 of the drawings is illustrated one method of accomplishing the purposes of my invention in mechanisms of the type where the actuator or tappet rod is alined with the valve. In such instances I may interpose between the ends of the valve stem and tappet rod a member 23 and between opposite faces of this member and the respective ends of the valve stem and tappet rod I interpose balls 20″. Curved surfaces may be provided on the member and on the ends of the valve stem and tappet rod to produce a desired wedging effect and a spring 22″ of any desired type may be utilized to maintain the parts of an arrangement of this character in contact.

It will be obvious that various other arrangements may be provided for accomplishing the results gained by the present structures and that the present structures themselves may be modified in various respects as for instance by providing an anti-friction roller in lieu of the ball in the preferred form of the invention, or by providing a single curved wedging surface either on the link or on the lever arm instead of a wedging surface on each and for such reasons I desire to have it understood that I reserve as my right all such variations as may be included within the scope of the appended claims.

I claim:

1. In a valve operating mechanism, a valve, an actuator therefor, a lever arm between said valve and actuator, and a movable fulcrum for said lever arm including rollable wedging means to maintain said lever in contact with said valve and actuator.

2. In a valve operating mechanism, a valve, an actuator therefor, a lever arm between said valve and actuator, a movable fulcrum for said lever arm, and wedging means acting between said movable fulcrum and said lever arm to maintain said lever arm in contact with said valve and actuator.

3. In a valve operating mechanism, including a pair of members one of which is provided with a wedge surface, and bodily movable means between said members having rollable contact with said wedge surface to maintain the parts of the mechanism in contact.

4. In a valve operating mechanism, a valve, an actuator therefor, a lever between said valve and actuator, a pivoted link, a wedging connection between said link and said lever, and spring means associated with said link constantly exerting a force to cause said wedging connection to maintain the parts of the mechanism in contact.

5. In a valve operating mechanism, a valve, an actuator therefor, a rocker arm between said valve and actuator, a movable fulcrum for said rocker arm, a wedging surface on said rocker arm and a rollable member disposed between said rocker arm and said movable fulcrum and engaging the wedging surface of the rocker arm to thereby constantly maintain the elements of the mechanism in contact.

6. In a valve operating mechanism for engines, a valve, an actuator therefor, a rocker arm between said valve and actuator, a link supported by the engine and providing a movable fulcrum for said rocker arm, wedging surfaces on the link and rocker arm, respectively, a rollable member disposed between said link and rocker arm and engaging their respective wedging surfaces, and yieldable means constantly tending to relatively move said link and rocker arm to thereby cause said rollable member to react from said wedging surfaces and thereby maintain the parts of the mechanism in contact.

7. In a valve operating mechanism, a valve, an actuator therefor, a lever arm between said valve and actuator, and a movable fulcrum for said lever arm including wedging means to maintain said lever arm in contact with said valve and actuator.

8. A valve operating mechanism including a pair of members one of which is movable and provided with a wedge surface, a bodily movable element between said members having a rollable contact with said wedge surface, and means acting to cause a wedging action between said wedge surface and said element, thereby to maintain the parts of the mechanism in contact.

9. A valve operating mechanism including a pair of movable members one of which is provided with a wedge surface, an element between said members having rollable contact with said wedging surface, each of said members being movable independently of said rollable element, and means acting to cause a wedging action between said wedge surface and said rollable element, thereby to maintain the parts of the mechanism in contact.

10. A valve operating mechanism including a pair of members one of which is movable, a wedge surface on each member, a bodily movable element between said members having rollable contact with the wedge surface of each member, and means acting to cause a wedging action between said wedge surfaces and said element thereby to maintain the parts of the mechanism in contact.

11. A valve operating mechanism including a pair of movable members each of which is provided with a wedge surface, an element between said members having rollable contact with the wedge surface of both members, each of said members being movable independently of said rollable element, and means acting to cause a wedging action between said wedging surfaces and said rollable element, thereby to maintain the parts of mechanism in contact.

12. In a valve operating mechanism, a valve including a stem, an actuator, a rocker arm between said valve and actuator having rolling contact with said stem, and a fulcrum member for said rocker arm having rolling contact therewith and movable longitudinally of the rocker arm to permit said rocker arm to roll on said valve stem.

13. In a valve operating mechanism for engines, a valve including a stem, an actuator, a rocker arm between said valve and actuator having rolling contact with said stem, a fulcrum member for said rocker arm movable longitudinally with respect thereto to permit said rocker arm to roll on said valve stem, said fulcrum member being supported from a fixed part of the engine, and rolling means between said fulcrum member and said fixed part permitting the fulcrum member to shift with respect to said fixed part while rolling.

14. In a valve operating mechanism, a valve, an actuator, a rocker arm, a fulcrum member for said rocker arm movable by the latter longitudinally with respect thereto during operation of the mechanism, and rolling means between said fulcrum member and said rocker arm.

15. In a valve operating mechanism, a rocker arm, a support therefor, and an anti-friction bearing between said rocker arm and said support consisting of a single member rolling with respect to both of them.

16. In a valve operating mechanism for engines, a valve including a stem, an actuator, a rocker arm between said valve and actuator, a fulcrum member for said rocker arm movable to permit said rocker arm to roll on said valve stem, said fulcrum member being supported from a fixed part of the engine, rolling means between said fulcrum member and said fixed part permitting the fulcrum member to shift with respect to said fixed part while rolling, and rolling means between said fulcrum member and said rocker arm.

17. In a valve operating mechanism, a rocker arm and a support therefor one of which is provided with a trough of V-shaped cross section, and a member between said rocker arm and said support rolling in said trough.

18. In a valve operating mechanism, a rocker arm and a support therefor one of which is provided with a trough of V-shaped cross section extending in a direction longitudinally with respect to the rocker arm, and a convexly curved member between said support and said rocker arm rolling in said trough.

19. In a valve operating mechanism, a rocker arm and a support therefor one of which is provided with a trough of V-shaped cross section extending in a direction longitudinally with respect to the rocker arm, and a single ball between said support and said rocker arm rolling in said trough.

20. In a valve operating mechanism, a rocker arm and a support therefor one of which is provided with surfaces converging with respect to one another and extending in a direction longitudinally with respect to the rocker arm, and an anti-friction bearing between said rocker arm and its support consisting of means rolling on and having contact at a single point at all times with each of said surfaces.

21. I a valve mechanism for engines, a rocker arm, a support therefor in the form of a yoke comprising spaced side portions and end portions connecting them, and bearing members at the ends of said yoke having rolling contact, respectively, with said rocker arm and with a fixed part of the engine.

In testimony whereof I hereunto affix my signature.

DORSEY F. ASBURY.